United States Patent
Colliou

(10) Patent No.: US 10,450,947 B2
(45) Date of Patent: Oct. 22, 2019

(54) DEVICE FOR CONTROLLING THE QUANTITY OF AIR ADMITTED TO A SUPERCHARGED INTERNAL COMBUSTION ENGINE AND METHOD OF USE THEREOF

(71) Applicant: IFP Energies nouvelles, Rueil-Malmaison (FR)

(72) Inventor: Thierry Colliou, Les Cotes d'Arey (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 94 days.

(21) Appl. No.: 15/328,812

(22) PCT Filed: Jun. 24, 2015

(86) PCT No.: PCT/EP2015/064282
§ 371 (c)(1),
(2) Date: Jan. 24, 2017

(87) PCT Pub. No.: WO2016/012187
PCT Pub. Date: Jan. 28, 2016

(65) Prior Publication Data
US 2017/0211466 A1    Jul. 27, 2017

(30) Foreign Application Priority Data
Jul. 24, 2014 (FR) ................... 14 57141

(51) Int. Cl.
*F02B 37/02* (2006.01)
*F02B 37/16* (2006.01)
(Continued)

(52) U.S. Cl.
CPC .......... *F02B 37/225* (2013.01); *F02B 37/025* (2013.01); *F02B 37/168* (2013.01);
(Continued)

(58) Field of Classification Search
CPC .............................. F02B 37/16–168
See application file for complete search history.

(56) References Cited

U.S. PATENT DOCUMENTS

| 3,877,230 A | 4/1975 | Overy et al. |
| 4,018,053 A | 4/1977 | Rudert et al. |

(Continued)

FOREIGN PATENT DOCUMENTS

| DE | 102 32 519 A1 | 1/2004 |
| DE | 10 2012 202857 A1 | 8/2013 |

(Continued)

OTHER PUBLICATIONS

International Search Report for PCT/EP2015/064282 dated Jul. 31, 2015; English translation submitted herewith (10 pages).

*Primary Examiner* — Laert Dounis
(74) *Attorney, Agent, or Firm* — Fitch, Even, Tabin & Flannery, LLP

(57) ABSTRACT

The present invention is a device for controlling a quantity of air introduced into an inlet of a boosted internal combustion engine with the engine having exhaust gas outlets each connected to an exhaust manifold of at least one cylinder. The device includes a boosting device comprising a turbocharger having a turbine with intakes connected to the exhaust gas outlets, an external-air compressor and a duct for partially transferring the compressed air from the compressor to the intakes. The partial transfer duct has branches connected to the turbine intakes which each have a regulator valve for controlling circulation of compressed air in the branches.

7 Claims, 2 Drawing Sheets

(51) Int. Cl.
*F02B 37/22* (2006.01)
*F02M 35/10* (2006.01)

(52) U.S. Cl.
CPC *F02M 35/10157* (2013.01); *F02M 35/10268* (2013.01); *Y02T 10/144* (2013.01)

(56) References Cited

U.S. PATENT DOCUMENTS

| | | | | |
|---|---|---|---|---|
| 4,373,336 A * | 2/1983 | Horler | F02B 37/183 | 60/605.1 |
| 4,404,805 A * | 9/1983 | Curtil | F02B 37/10 | 123/41.41 |
| 4,559,784 A * | 12/1985 | Jenny | F02B 33/44 | 60/606 |
| 2009/0049835 A1* | 2/2009 | Onodera | F02B 37/025 | 60/605.2 |
| 2017/0211466 A1* | 7/2017 | Colliou | F02B 37/025 | |
| 2018/0128160 A1* | 5/2018 | Colliou | F02B 37/025 | |
| 2018/0142610 A1* | 5/2018 | Colliou | F02B 37/025 | |
| 2018/0149075 A1* | 5/2018 | Baudrand | F02B 37/025 | |
| 2018/0171866 A1* | 6/2018 | Colliou | F02B 37/025 | |

FOREIGN PATENT DOCUMENTS

| | | | | |
|---|---|---|---|---|
| DE | 102012202857 A1 * | 8/2013 | | F02D 23/00 |
| DE | 102015006288 A1 * | 12/2015 | | F02B 37/025 |
| FR | 2 281 501 A1 | 3/1976 | | |
| FR | 2 478 736 A1 | 9/1981 | | |
| GB | 2 041 084 A | 9/1980 | | |
| GB | 2 438 360 A | 11/2007 | | |
| JP | S57-200618 A | 12/1982 | | |
| JP | 05086877 A * | 4/1993 | | F01N 3/02 |

* cited by examiner

DEVICE FOR CONTROLLING THE QUANTITY OF AIR ADMITTED TO A SUPERCHARGED INTERNAL COMBUSTION ENGINE AND METHOD OF USE THEREOF

CROSS-REFERENCE TO RELATED APPLICATIONS

Reference is made to International Application No. PCT/EP2015/064282 filed Jun. 24, 2015 and French application Ser. No. 14/57,141 filed Jul. 24, 2014, which are hereby incorporated herein by reference in their entirety.

BACKGROUND OF THE INVENTION

Field of the Invention

This invention relates to a device for controlling the quantity of air introduced into the inlet of a boosted internal combustion engine, particularly a stationary engine or one for a motor vehicle or commercial vehicle and a method of controlling the quantity of air for such an engine.

Description of the Prior Art

As is widely known, the power delivered by an internal combustion engine is dependent on the quantity of air introduced into this engine's combustion chamber, a quantity of air which, itself, is proportional to the density of this air.

Therefore, it is customary to increase this quantity of air by compressing external air before it is let into this combustion chamber. This operation, called boosting, can be carried out by any means, such as a turbocharger or a mechanically driven compressor, which may be centrifugal or of the positive-displacement type.

In the case of boosting by a turbocharger, the latter comprises a single flow or double flow rotary turbine, connected by a shaft to a rotary compressor. The exhaust gases coming from the engine pass through the turbine which is then rotatingly driven. This rotation is then transmitted to the compressor which, by its very rotation, compresses the external air before it is introduced into the combustion chamber.

As is better described in French patent application 2 478 736, in order to significantly increase this quantity of compressed air in the engine combustion chamber, it is intended to increase the compression of external air by the compressor further still.

This is affected more particularly by increasing the speed of rotation of the turbine and therefore of the compressor.

For this, a portion of the compressed air coming out of the compressor is diverted to be let directly into the turbine intake, mixing with the exhaust gases. This turbine is then crossed by a greater quantity of fluid (a mixture of compressed air and exhaust gas), whereby the speed of rotation of the turbine and consequently of the compressor can be increased. Therefore, with this compressor speed increase, it is possible to increase the pressure of the external air which will be compressed in this compressor and then introduced into the engine combustion chamber.

Due to this, the compressed air is of a higher density whereby the quantity of air contained by the combustion chamber can be increased.

This type of boosted engine, although satisfactory, nevertheless has some significant drawbacks.

In fact, the flow rate of the compressed air which is let into the turbine intake is not correctly controlled, which may lead to an engine malfunction.

Therefore, by way of example, in the event of too great a quantity of compressed air being diverted to the turbine intake, the exhaust gases entering the turbine are cooled too much by this air and bring about a reduction in the overall performance of the boosting.

SUMMARY OF THE INVENTION

The present invention rectifies the aforementioned drawbacks by use of a device for controlling the quantity of air introduced into the intake of a boosted internal combustion engine with which it is possible to respond to all the engine's power requirements.

With the invention it is also possible to carry out a transfer of compressed air from the inlet to the exhaust even when the mean pressure of the compressed air in the inlet is lower than that of the gases in the exhaust. It is simply sufficient that there are phases during the engine operation cycle where the pressure in the inlet is higher than that in the exhaust.

To this end, the present invention is to a device for controlling the quantity of air introduced into the inlet of a boosted internal combustion engine. the engine comprises two exhaust gas outlets with each outlet being connected to an exhaust manifold of at least one cylinder. The invention comprises a boosting device with a turbocharger comprising a double intake turbine connected to the exhaust gas outlets as well as an external-air compressor and a duct for partial transfer of the compressed air from the compressor to the turbine intakes wherein the partial transfer duct comprises two branches connected to the turbine intakes which each carry a valve regulator controlling the circulation of the compressed air in these branches.

Advantageously, the branches can each also carry a non-return valve.

One of the branches can be connected to the other branch with a connecting line.

The connecting line can carry valve regulation.

The valve regulation can comprise proportional valves.

The transfer duct can carry heating for the compressed air circulating therein.

The heating can comprise a heat exchanger.

The heat exchanger can comprise an intake for exhaust gas coming from the turbocharger turbine and an exhaust gas outlet to the exhaust line.

The invention also relates to a method of controlling the quantity of compressed air in the inlet of a boosted internal combustion engine. The engine comprises two exhaust gas outlets with each outlet being connected to an exhaust manifold of a at least one cylinder. The invention comprises a boosting device with a turbocharger with a double intake turbine connected to the exhaust gas outlets as well as an external-air compressor and a duct for partial transfer of the compressed air from the compressor to the turbine intakes, wherein a portion of the compressed air is introduced from the compressor into the turbine's exhaust gas intake sections.

The method can divide the transfer duct into two branches and can control the circulation of the compressed air in each of the branches with a regulator valve.

The method can heat the compressed air circulating in the transfer duct before intake into the turbine.

BRIEF DESCRIPTION OF THE DRAWINGS

The other features and benefits of the invention will appear from reading the description which is to follow, given for solely illustrative purposes and on a non-limiting basis and to which the following are attached:

In FIG. 1, the internal combustion engine 10 comprises at least two cylinders, here four cylinders referenced $12_1$ to $12_4$ from the left of the figure.

Figure 1:
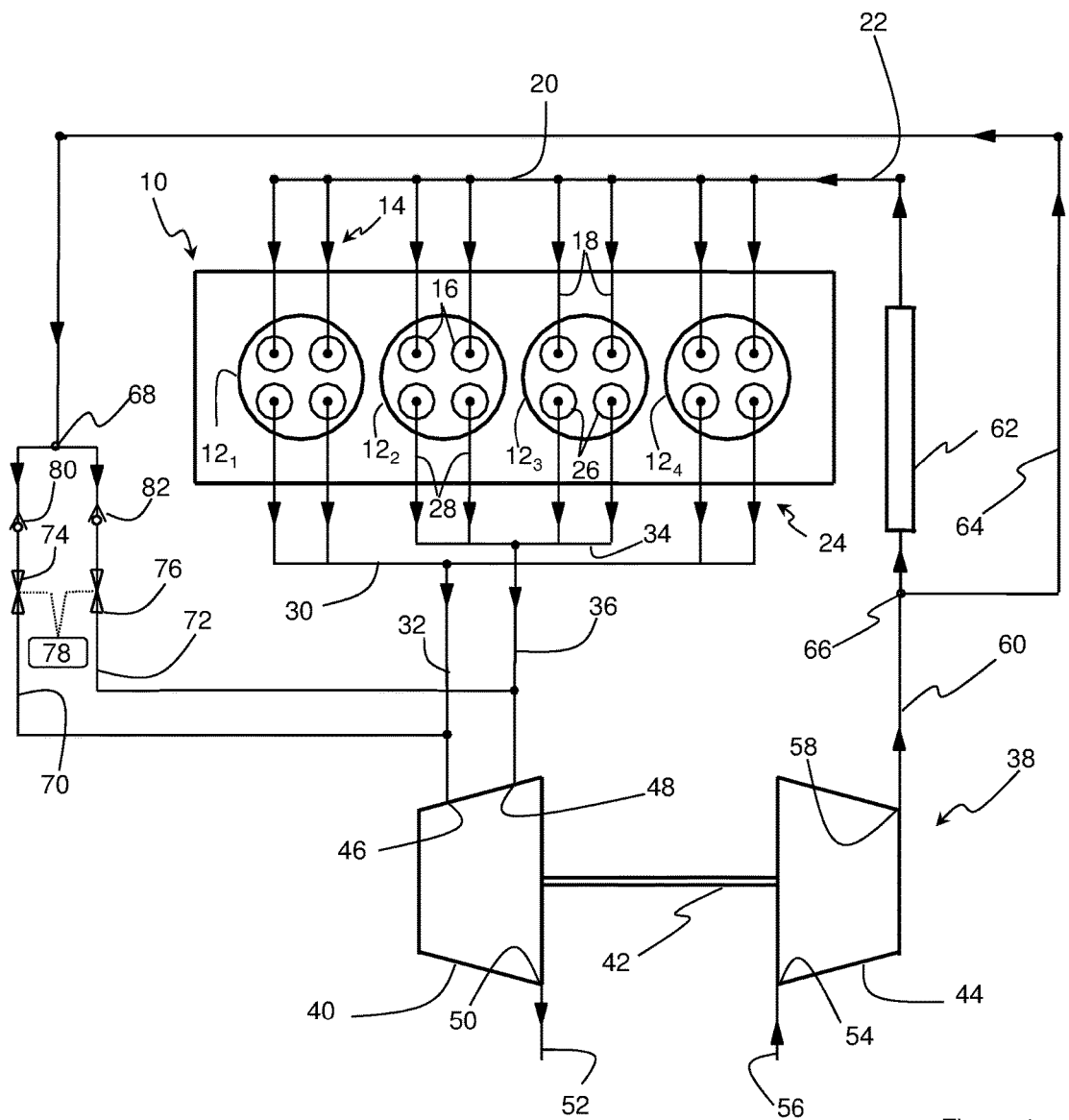
FIG. 1 which illustrates an internal combustion engine with its boosting device according to the invention.

Preferably, this engine is a direct injection internal combustion engine, particularly of the Diesel type but this in no way excludes any other type of internal combustion engine.

Each cylinder comprises inlet 14 with at least one inlet valve 16, here two inlet valves each control an induction pipe 18. The induction pipes 18 end at an inlet manifold 20 supplied by a supply duct 22 with inlet air, such as compressed air.

This cylinder also comprises burned gas exhaust 24 with at least one exhaust valve 26, here also two valves, each controlling an exhaust tube 28.

In the example illustrated, the engine is prepared for operating with a firing order of 1-3-4-2. In view of this firing order, the exhaust tubes of the first cylinder $12_1$ and second cylinder $12_4$, which form a first unit of at least one cylinder, are connected to a first exhaust manifold 30 with a first exhaust gas outlet 32. The exhaust tubes of the third and fourth cylinders $12_2$ and $12_3$, which form a second unit of at least one cylinder, are connected to a second exhaust manifold 34 which comprises a second exhaust gas outlet 36.

The two exhaust gas outlets lead to a turbocharger 38 for compressing air and more particularly to the expansion turbine 40 of this turbocharger.

As illustrated in FIG. 1, the turbocharger is a double intake turbocharger, better known by the term "Twin Scroll" turbocharger.

This type of turbocharger comprises the expansion turbine 40 which is swept by the exhaust gases and is rotatily connected by a shaft 42 to a compressor 44.

At the turbine, the exhaust gas intake is divided into two sections which are a first intake section 46 connected to the first exhaust gas outlet 32 of the first manifold 30 and a second intake section 48 connected to the second exhaust gas outlet 36 of the second exhaust manifold 34.

The gas discharge 50 of the turbine 40 is conventionally connected to the engine's exhaust line 52.

The compressor 44 of the turbocharger 38 comprises an external-air inlet 54 supplied by a supply duct 56. This compressor's compressed air outlet 58 is connected to the supply duct 22 of the inlet manifold 20 by a duct 60.

Advantageously, it can be arranged to place a compressed air cooler 62 on the duct 60, between the compressor and the duct 22.

As can be seen better in FIG. 1, with a transfer duct 64, a portion of the compressed air coming out of the compressor 44 can be made to circulate to the turbine intakes 46 and 48.

More precisely, this partial transfer duct 64 starts in the duct 60, at an intersection point 66 between the compressor and the cooler 62 and is then divided, from a bifurcation point 68, into two branches 70 and 72. The branch 70 leads to the turbine intake 46 via its connection to the first exhaust gas outlet 32 and the branch 72 leads to this turbine's other intake 48 via its connection to the exhaust gas outlet 36. Each branch carries regulator valve means 74 and 76, such as a proportional valve, controlled by a control 78, which can be common to the two regulator valves. Therefore, with this valve, the circulation of the compressed air in the branch can be controlled.

Advantageously, each branch also comprises a non-return valve 80 and 82 which prevents the circulation of the compressed air from the branch to the compressor, while preventing the two branches from coming into communication.

Therefore, with this configuration, it is possible during operation of the engine to take advantage of the zones of low exhaust pressure prevailing intermittently in the exhaust manifolds to introduce compressed air into the turbine and thus to increase the flow rate of this turbine and consequently of the compressor. With this, it is also possible to have more efficient boosting for low engine speeds.

During operation, in case of a requirement for air in a large quantity in the cylinders, the valves 74 and 76 are opened to introduce compressed air from the compressor 44 into the turbine 40.

The compressed air coming from the compressor 44 circulates in the duct 64 and then in the branches 70 and 72 to reach the exhaust gas intakes 46 and 48 of the turbine 40, delivering surplus fluid to the turbine.

Therefore, the turbine is swept not only by the exhaust gases from the outlets 32 and 36 but also by compressed air which is added to these gases. Because of this, turbine rotation is increased, which causes an increase in compressor rotation and consequently an increase in the pressure of the compressed air which comes from this compressor.

The valves 74 and 76 are controlled by the control or control means 78 to let into the turbine the quantity of compressed air which meets the engine's boosting requirements.

Figure 2:
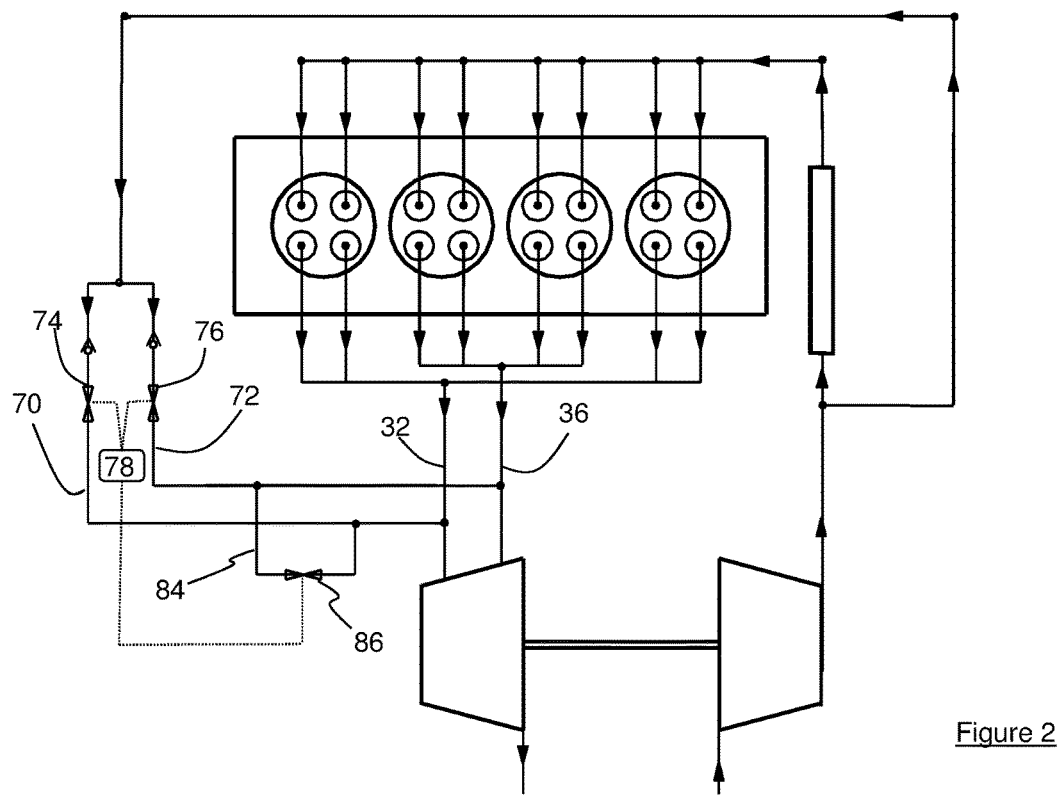
FIG. 2 which shows a variant of the internal combustion engine with its boosting device and FIG. 3 which illustrates a variant of the internal combustion engine with its boosting device according to FIG. 1.

The variant in FIG. 2 can be distinguished from FIG. 1 due to the placing of a connecting duct 84 between the two branches 70 and 72. This duct is provided with a regulator valve or regulator means 86, such as a proportional valve which here is also controlled by the control or control means 78.

One of the ends of this duct is connected to the branch 70 at a point situated between the valve 74 and the exhaust gas outlet 32 and the other end is connected at a point situated between the valve 76 and the exhaust gas outlet 36.

With the connecting duct 84, it is possible to control the communication of fluid between the two branches reaching the turbine.

More precisely, with connecting duct 84, it is possible to divert a portion of the compressed air circulating in one of the branches into the other branch to mix with the exhaust gases at the intakes of the turbine 40.

Furthermore, with the connecting duct 84, it is possible to restore in one branch of the turbine the pressure differential of the exhaust gases (or pulsating exhaust) of the other branch which is angularly offset in the engine combustion cycle.

Figure 3:
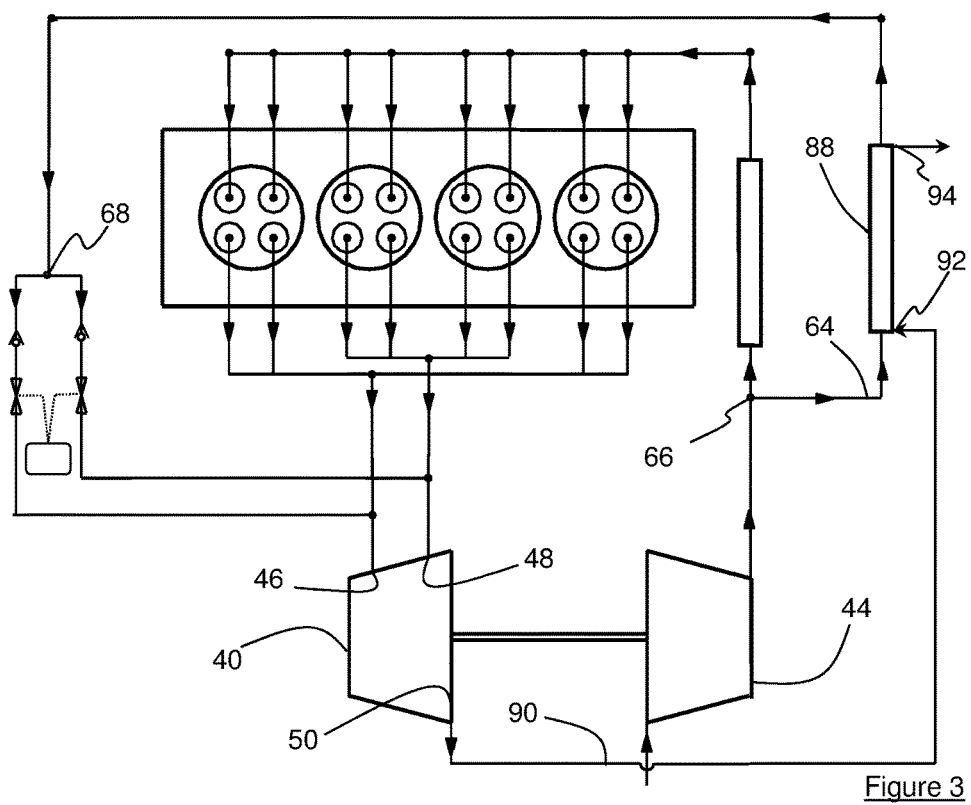

In FIG. 3, which essentially comprises the same elements as those in FIG. 1, the compressed air leaving the compressor 44 and circulating in the transfer duct 64 is heated before being introduced into the turbine 40.

For this purpose, the transfer duct 64 carries a heating means or heater 88 of heating the compressed air, here a heat exchanger in the form of a heating radiator, placed between the intersection point 66 and the bifurcation point 68 which this duct comprises. This radiator is crossed by the compressed air which circulates in this duct while being swept by the engine exhaust gases. These exhaust gases come from the turbine discharge 50 and are conveyed by a duct 90 to the radiator intake 92. The exhaust gases sweep this radiator, transferring the heat they contain to the compressed air, and subsequently leaving this radiator through the outlet 94, to be directed to the engine exhaust line.

Therefore, a portion of the exhaust gas energy is recovered by the compressed air which is introduced into the turbine through one or other of the intakes 46 and 48.

Therefore, with this heated compressed air, it is possible to supply extra energy to the turbine which, as a result, will rotate at a higher speed. This high speed of rotation is then transmitted to the compressor, which will carry out higher compression of external air.

The invention claimed is:

1. A device for controlling a quantity of air introduced into an air inlet of a boosted internal combustion engine with the engine including at least one cylinder and exhaust gas outlets connected to an exhaust manifold comprising:
    a boosting device comprising a turbocharger including a turbine having turbine intakes each respectively connected to a different exhaust gas outlet, an external-air compressor for compressing external air and a duct for partial transfer of the compressed air from the external-air compressor to the turbine intakes; and
    the partial transfer duct comprises branches each respectively having an outlet connected to a different intake of the turbine with each branch including a regulator valve which controls circulation of compressed air in the branches of the partial transfer duct with the branches also being connected together by a connecting line upstream from where the branches and the exhaust gas outlets meet for further controlling circulation of compressed air in the branches of the partial transfer duct to the turbine intakes.

2. The device according to claim 1 wherein the branches also include a non-return valve which prevents circulation of air back into the compressor.

3. The device according to claim 1 wherein the partial transfer duct includes a heater for heating compressed air circulating therein.

4. The device according to claim 3 wherein the heater comprises a heat exchanger.

5. The device according to claim 4 wherein the heater comprises an intake for exhaust gas coming from the turbine and the exhaust gas outlets.

6. A method for controlling a quantity of air introduced into an air inlet of a boosted internal combustion engine with the engine including at least one cylinder and exhaust gas outlets connected to an exhaust manifold including a boosting device comprising a turbocharger including a turbine having turbine intakes each respectively connected to different exhaust gas outlets, an external-air compressor for compressing external air and a partial transfer duct for the partial transfer of compressed air from the external-air compressor into the turbine intakes, and the partial transfer duct comprising branches each respectively having an outlet connected to a different intake of the turbine with each branch including a regulator valve which controls circulation of compressed air in the branches of the partial transfer duct with the branches also being connected together by a connecting line upstream from where the branches and the exhaust gas outlets meet for further controlling circulation of compressed air in the branches of the partial transfer duct to the turbine intakes comprising:
    compressing external air with the external air compressor to produce flow of compressed air from the external air compressor into the partial transfer duct through the branches into the turbine intakes;
    introducing a portion of the compressed air into the turbine intakes to control rotational speed of the turbine including controlling the flow of compressed air through the regulator valves in the branches into the turbine intakes; and
    controlling the flow of compressed air in the branches further by controlling flow of compressed air through the connecting line by control of a valve located therein.

7. The method of claim 6 comprising:
heating the compressed air circulating in the transfer duct before flow into the turbine intakes.

* * * * *